Sept. 15, 1953         T. H. CORE         2,651,882
TOY VEHICLE AND STEERING MEANS THEREFOR
Filed Feb. 23, 1950         3 Sheets—Sheet 1
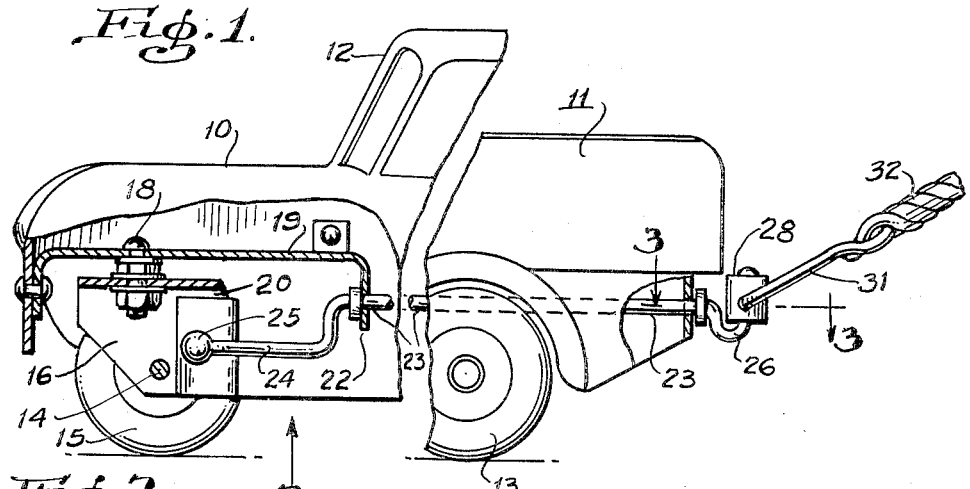
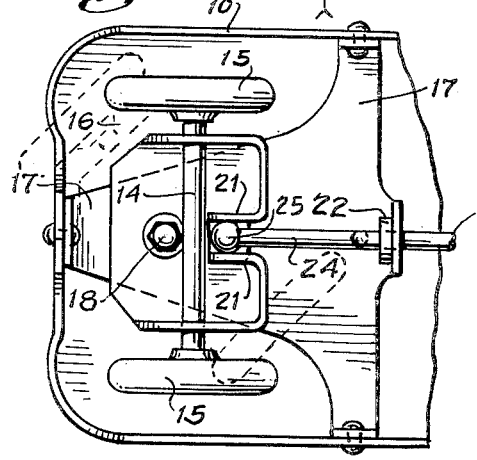
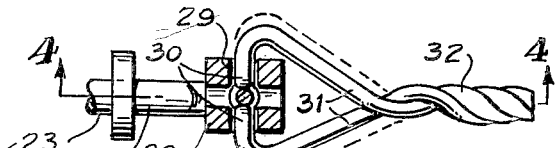
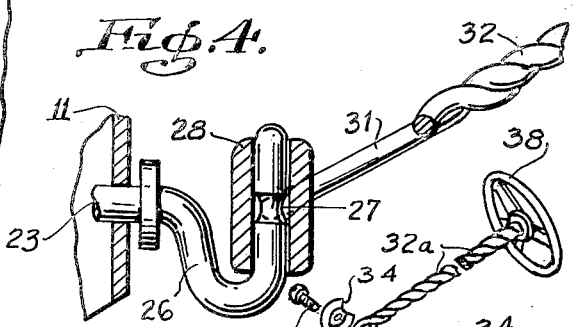
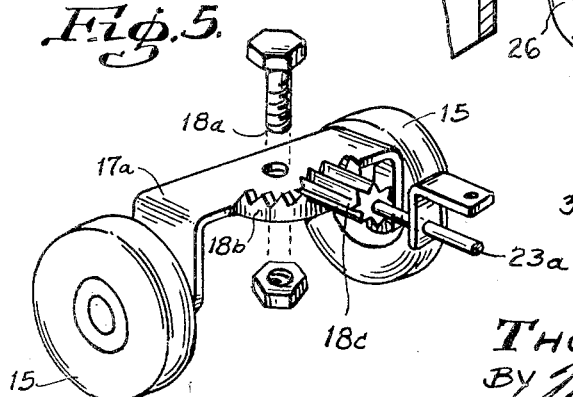
INVENTOR.
THOMAS H. CORE
BY Martin P. Smith
ATTORNEY.

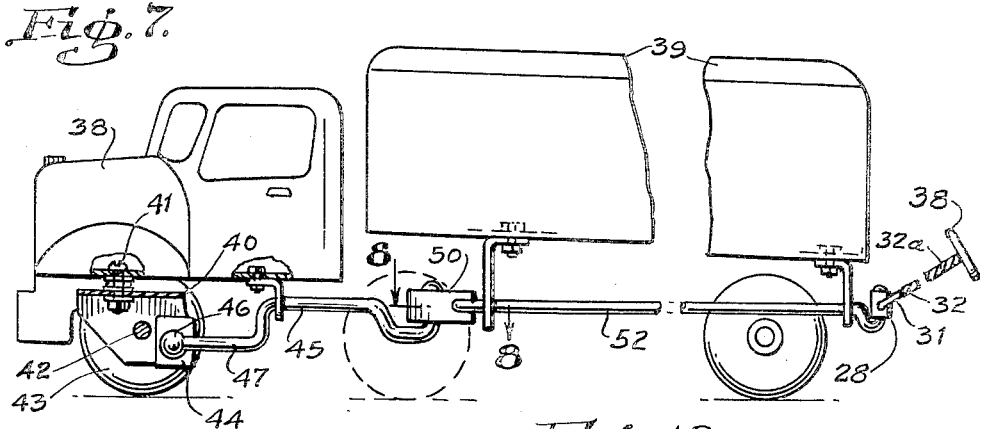
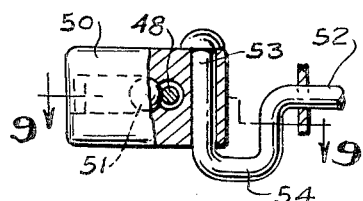
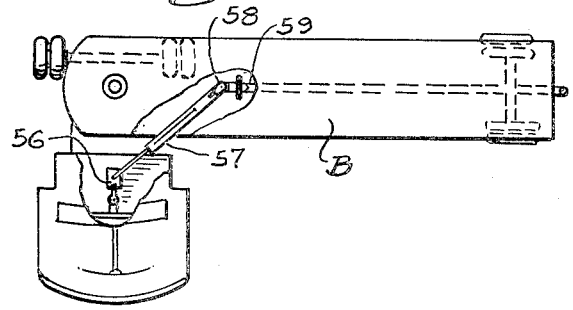
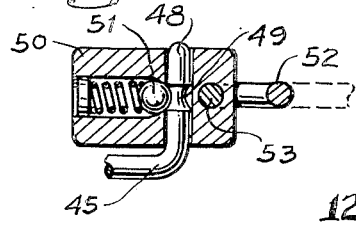
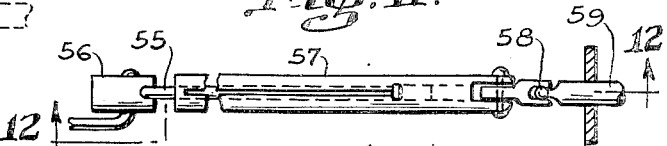
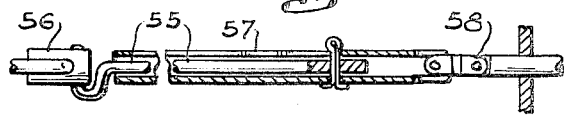
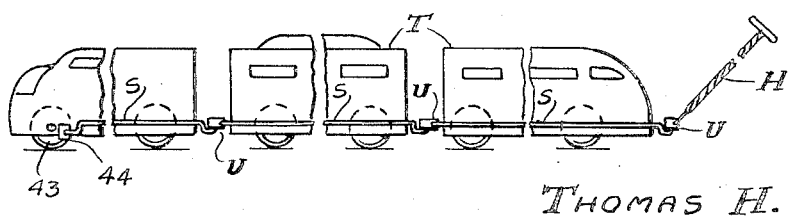
INVENTOR,
THOMAS H. CORE Sept. 15, 1953          T. H. CORE          2,651,882
TOY VEHICLE AND STEERING MEANS THEREFOR
Filed Feb. 23, 1950          3 Sheets-Sheet 3
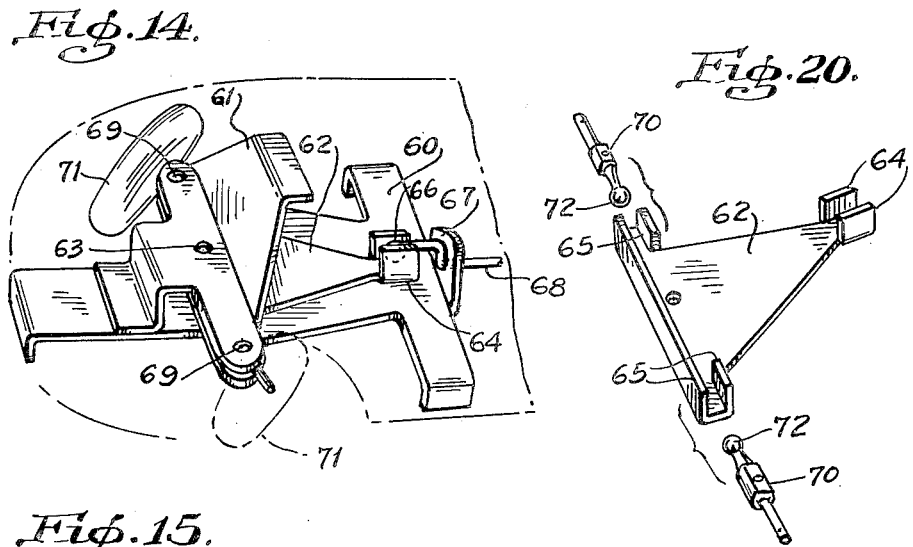
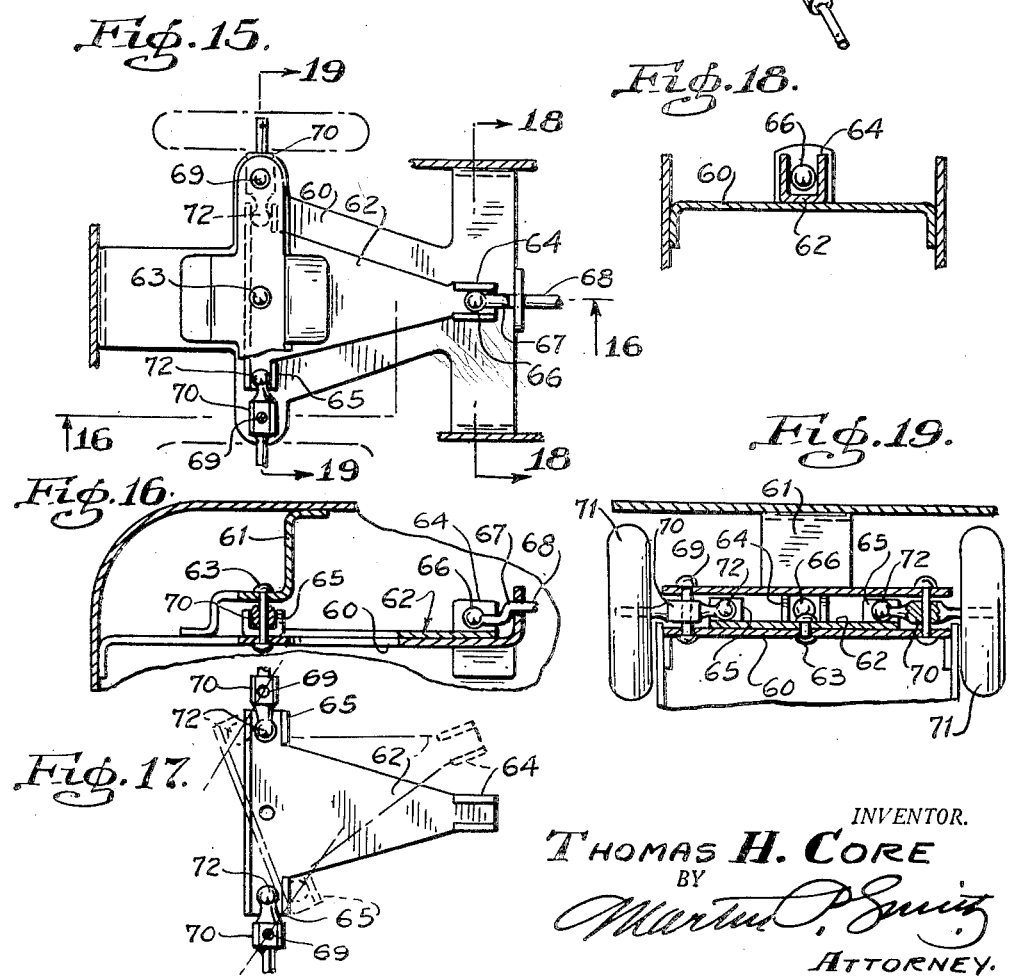
INVENTOR.
THOMAS H. CORE
BY
ATTORNEY.

Patented Sept. 15, 1953

2,651,882

UNITED STATES PATENT OFFICE 2,651,882

TOY VEHICLE AND STEERING MEANS THEREFOR

Thomas H. Core, Glendale, Calif.

Application February 23, 1950, Serial No. 145,860

3 Claims. (Cl. 46—201)

My invention relates generally to wheeled toys such as simulated motor vehicles, trucks, tractors and the like, and has for its principal object, to provide simple, practical and efficient means for steering the toy as it is pushed forwardly by means of a handle actuated by the operator from the rear of the vehicle or, a series of coupled vehicles.

Further objects of my invention are, to generally improve upon and simplify the existing forms of steering and coupling means so that the same functions with very little effort and friction, to design the steering means so as to provide for 180 degree movement of the steering wheel, thus giving an ideal steering ratio with very sensitive control, and, further, to mount the wheeled axle-carrying member on the main frame of the vehicle so as to obtain a caster-like effect and thereby materially facilitating the steering functions.

With the foregoing and other objects in view, my invention consists in certain novel features of construction and arrangement of parts which will be hereinafter more fully described and claimed and illustrated in the accompanying drawings, in which—

Fig. 1 is a side elevational view, partly broken away and in section, of a toy motor truck and showing my improved steering mechanism applied thereto.

Fig. 2 is a view looking upwardly at the under side of the front portion of the truck, as indicated by the arrow 2 in Fig. 1.

Fig. 3 is an enlarged horizontal section taken on the line 3—3 of Fig. 1.

Fig. 4 is a vertical section taken on the line 4—4 of Fig. 3.

Fig. 5 is a perspective view of a modified form of the steering rod connection with the pivoted wheel carrying frame.

Fig. 6 is a perspective view of the disassembled parts of the steering rod or handle.

Fig. 7 is an elevational view of my improved steering means associated with a truck and semi-trailer.

Fig. 8 is an enlarged horizontal section taken on the line 8—8 of Fig. 7.

Fig. 9 is a vertical section taken on the line 9—9 of Fig. 8.

Fig. 10 is a plan view showing a modified form of the steering gear adaptable to a truck and semi-trailer.

Fig. 11 is a plan view of a slip joint, which may be used in the steering gear.

Fig. 12 is a vertical section taken on the line 12—12 of Fig. 11.

Fig. 13 is an elevational view showing a plurality of wheeled toy vehicles equipped and coupled with my improved steering gear.

Fig. 14 is a perspective view of a modified form of the steering mechanism.

Fig. 15 is a plan view partly in section of the form of steering gear shown in Fig. 14.

Fig. 16 is a longitudinal section taken on the line 16—16 of Fig. 15.

Fig. 17 is a plan view of parts of the modified form of steering gear.

Fig. 18 is a cross section taken on the line 18—18 of Fig. 15.

Fig. 19 is a cross section taken on the line 19—19 of Fig. 15.

Fig. 20 is a perspective view of parts of the modified form of steering gear.

Referring by numerals to the accompanying drawings which show preferred and modified forms of the invention, 10 designates the hood portion of a toy truck, 11 the truck body, 12 the driver's cab, 13 the rear wheels, and 14 the axle carrying front wheels 15. Axle 14 is journalled in side walls 16, which depend from a plate 17, same being pivotally mounted on a vertical stud or bolt 18, which depends from a frame plate 19, secured within hood 10. The axis of pivot bolt 18 is slightly in front of the axis of axle 14, thus providing for a caster-like mounting for the front wheels. Walls 20 project toward each other from the rear ends of walls 16 and projecting forwardly from the inner edges of said walls are vertically disposed parallel walls 21, disposed spaced to the rear of axle 14.

Journalled in suitable bearings 22 on the lower portion of body 11, is a steering shaft 23, the forward end of which terminates in a crank 24 having a small ball 25 on its forward end, which ball is positioned between walls 21.

To provide a universal joint connection between the steering shaft and steering handle, the rear end of rod 23 beyond rear bearing 22 is bent into U-shape, and the outer leg thereof is provided with a circumferential groove 27.

Rotatably mounted on leg 26 is a collar 28, having oppositely disposed apertures 29, in which are loosely arranged fingers 30, which project from the ends of the resilient end portions 31, of a handle member 32, composed of twisted wires. (See Figs. 3, 4 and 5.) The ends of fingers 30 enter groove 27 in leg 26, thus holding the parts of the universal joint in assembled relation.

A second handle member 32a of twisted wire, is combined with member 32 to provide a handle of sufficient length to manipulate the toy vehicle and enabling the handle parts to be folded into short compass when packed for storage or transportation. The adjacent ends of handle members 32 and 32a are provided with loops 33, which are rigidly clamped to each other by flanged washers 34, a bolt 35, nut 36, and lock washer 37. (See Fig. 6.)

The outer end of handle member 32a carries a steering wheel 38. The handle just described provides simple means for pushing and pulling the toy vehicle and by manual rotation of said handle, steering shaft 23 will be rotated so as to swing crank 24 to one side or the other, and the bearing of ball 25 on the end of said crank will exert pressure on the corresponding wall 21 and thus swing plate 17 on its axis 18 and shift the wheels 15 into angular positions and thereby steer the vehicle simultaneously with its forward or backward movement.

A modified form of the front wheel actuating means is shown in Fig. 5, and in this form, the transverse wheel carrying member 17a pivoted at 18a, is provided on its rear central portion with an arcuate rack 18b, concentric with said pivot and which rack is engaged by the teeth of a pinion 18c carried by the forward end of the steering shaft 23a.

In Figs. 7, 8 and 9, I have shown my improved steering gear and connections associated with a toy motor truck 38 and trailer 39, said truck having on its under side a frame 40, pivoted at 41 and carrying an axle 42, and wheels 43. This frame is practically identical with parts 16, 17 and 20, previously described, including spaced vertical walls 44.

A steering shaft member 45 is journalled beneath truck 38 and a ball 46 on a crank 47 at the forward end of said member 45 is positioned between walls 44.

The rear end of shaft 43 terminates in an upstanding pin 48, provided with a circumferential groove 49 and mounted to rotate on said pin is a block 50, recessed to receive a spring pressed ball 51, which engages in groove 49, thus releasably holding the block on pin 48.

The forward end of a rear steering shaft member 52 in alignment with member 45 is journalled beneath trailer 39 and the horizontal end portion 53 of a crank 54 is rotatably mounted in the rear portion of block 50. Thus, a simple, practical and effective universal joint is provided between the adjacent ends of steering shaft members 45 and 52, and which joint is capable of being readily disconnected. The rear end of shaft member 52 is identical with the structure illustrated in Figs. 3 and 4, so as to provide a universal joint connection between push rod and steering handle 32, 32a and 38 and the rear end of said member 52.

In Figs. 10, 11 and 12, I have shown the steering mechanism provided with telescopic or slip-joint means which enables the toy truck to be turned at right angles to the trailer to simulate the positions of a truck A, and trailer B during loading and unloading functions.

In this structure a steering rod member 55 identical with member 52 and connected to a universal joint member 56 at its forward end is arranged for limited telescopic movement in a tube 57, the rear end of the latter being connected by a universal joint 58 to the forward end of a steering rod 59, beneath trailer B and the rear end of which steering rod is connected by means of a universal joint such as shown in Figs. 4 and 5 to a steering handle.

In Fig. 13 I have shows a plurality of toy trailers T, coupled to each other and to a truck T by means of steering rods S, one beneath each trailer and truck, which rods are connected by universal joints U, as illustrated in Figs. 8 and 9, with the forward end of the forward rod provided with a crank for engaging and turning the wheel carrying axle beneath the truck and the rear end of the rear rod connected by a universal joint, such as shown in Figs. 3 and 4, to a steering rod and handle H.

In Figs. 14 to 20, I have shown a modified form of the steering gear which is not primarily intended to be used as a toy; rather, on superior quality models used for instructing student drivers, courtroom use and the like. This modification is characterized by the mounting of the wheels on knuckles or short spindles which swing on vertical axes as the steering rod actuated frame swings on its vertical axis.

This construction includes a frame 60 fixed in the forward portion of the vehicle body and carrying a smaller superposed frame 61. A steering plate 62 is pivoted on a vertical axis 63, between frames 60 and 61, with parallel upstanding plates 64 on its rear end and with parallel upstanding plates 65 on the forward portions of its sides. A ball 66, on a crank 67, at the forward end of a steering shaft 68 is positioned between plates 64.

Pivoted on vertical axes 69 between the forward side portions of frame 60 and 61 are short spindles or knuckles 70 carrying steering wheels 71 on their outer ends, and their inner ends terminating in balls 72, which are positioned between parallel walls 65.

Thus, as plate 62 is swung on its axis 63 by action of ball 66 on crank 67 of steering rod 68, the engagement of balls 72 between walls 65 will swing the spindles on their axes 69, thus turning the wheels in parallelism toward the right or left to steer the simulated car or truck.

This modified construction provides increased stability due to individual pivoting of the wheels, provides more realistic operation of the car or truck, requires less space in the toy body than the construction illustrated in Figs. 1 to 13 inclusive, reduces friction and is of simple rugged construction.

Thus it will be seen that I have provided a toy vehicle and steering means therefor which is simple in structure, inexpensive of manufacture, very effective in performing the functions for which it is intended and which affords interesting and attractive amusement for the users.

A particularly attractive feature of my invention is the construction whereby the toy vehicle or vehicles may be readily steered in either direction as they are pushed forwardly by the user, thus creating and enhancing the attractive illusion of really driving and controlling the operation of a motor vehicle or a series of coupled vehicles. Ball 25 maintains the same clearance with bearing plates 21 throughout the entire steering range, allows no play in any position and minimizes friction so as to provide smooth steering action at all times.

The caster mounting of the front axle enables the car to be pulled forwardly by means of a string with the wheels steering automatically. All mechanism of the toy, with the exception of the universal joint at the rear end of the steering rod, is concealed and as said mechanism is all located beneath or in the lower portions of the toy bodies, the forward thrust when pushing the toy is applied low in the toy's center of gravity.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation, which are capable of extended application in advance forms, and that the invention comprehends all construction within the scope of the appended claims.

The principles of my invention, viz: the steering and coupling means may be used in connection with any wheel-supported toy, singly, or coupled; for instance, simulated animals, birds, airplanes, baby strollers, earth-moving equipment, railway trains, and the like.

I claim as my invention:

1. In a toy vehicle and steering means therefor, a toy body, a horizontal frame fixed in the forward portion of said toy vehicle, a member pivoted to swing in a horizontal plane on said horizontal frame, a wheel carrying axle journalled in said pivoted member rearwardly and below the pivot therefor, a pair of spaced vertical walls on the rear portion of said pivoted member to the rear of said wheel carrying axle and below the pivot therefor, a longitudinally disposed steering shaft journalled in the lower portion of said toy body, a depending crank on the forward end of said shaft, a ball on the forward end of which crank which ball is positioned between said spaced walls, and an operating handle flexibly connected to the rear end of said shaft.

2. In a toy vehicle and steering means therefor, the combination with a wheel carrying frame mounted for operation in the front portion of the toy vehicle, and provided with a pair of spaced vertical walls, of a steering shaft mounted in the lower portion of the toy body, a crank on the forward end of said steering shaft, a ball on the forward end of said steering shaft and positioned between said parallel walls, a vertical crank on the rear end of said steering shaft, said crank being provided with a groove, a perforated collar on the grooved portion of said crank, a steering handle, and a pair of resilient fingers on the forward end of said steering handle which fingers pass through the perforations in said collar and enter the groove in said crank.

3. A toy vehicle and steering means therefor, a toy body, a member fixed to the forward portion of said toy body, a member pivoted to swing in a horizontal plane on said fixed member, a wheel carrying axle journalled in said pivoted member, rearwardly and below the pivot therefor, a pair of spaced walls on the rear portion of said pivoted member, to the rear of said wheel carrying axle, a longitudinally disposed steering shaft journalled in the lower portion of said toy body, a crank on the forward end of said shaft, the forward end of which crank is positioned between said spaced walls, a crank on the rear end of said steering shaft, said crank having an upwardly projecting rear end portion which is provided with a groove, a perforated collar mounted on the grooved end of said crank, and a handle having a pair of resilient fingers on its forward end, for engagement in the perforations in said collar, and in said groove in the upwardly turned rear end portion of the crank on steering shaft.

THOMAS H. CORE.

References Cited in the file of this patent

UNITED STATES PATENTS

| Number | Name | Date |
|---|---|---|
| 1,150,727 | Alexander | Aug. 17, 1915 |
| 1,996,546 | Lindberg | Apr. 2, 1935 |
| 2,133,530 | Beutlich | Oct. 18, 1938 |
| 2,144,461 | Muller | Jan. 17, 1939 |
| 2,260,679 | Neilson | Oct. 28, 1941 |
| 2,388,629 | Anderson | Nov. 6, 1945 |
| 2,584,561 | Denny | Feb. 5, 1952 |

FOREIGN PATENTS

| Number | Country | Date |
|---|---|---|
| 530,354 | Germany | July 28, 1931 |
| 774,873 | France | Oct. 1, 1934 |
| 62,667 | Denmark | Aug. 21, 1944 |